United States Patent [19]
Metzger

[11] Patent Number: 5,727,804
[45] Date of Patent: Mar. 17, 1998

[54] WHEELED LOAD CONNECTOR FOR PICKUP TRUCK

[75] Inventor: Robert C. Metzger, East Aurora, N.Y.

[73] Assignees: Tammy Ann Metzger, Alden; Lynette Metzger-Metro, East Aurora, both of N.Y.

[21] Appl. No.: 659,248

[22] Filed: Jun. 7, 1996

[51] Int. Cl.$^6$ ................................................. B60D 1/00
[52] U.S. Cl. ................................................. 280/476.001
[58] Field of Search ........................ 280/476.1, 416.1, 280/455.1, 456.1, 495, 511, 515, 400; 298/1 A

[56] References Cited

U.S. PATENT DOCUMENTS

| | | | |
|---|---|---|---|
| 2,460,466 | 2/1949 | Nogle | 280/33.4 |
| 2,780,480 | 2/1957 | Schwab | 280/499 |
| 3,087,744 | 4/1963 | Tanenbaum | 280/476.1 |
| 3,164,399 | 1/1965 | Lugash | 280/416.1 |
| 3,790,188 | 2/1974 | Johannes | 280/416.1 |
| 3,930,670 | 1/1976 | Haskins | 280/476 |
| 3,955,831 | 5/1976 | Whitchurch | 280/456.1 |

FOREIGN PATENT DOCUMENTS 1614975  12/1990  U.S.S.R. ................. 298/1 A

*Primary Examiner*—Ed L. Swinehart
*Attorney, Agent, or Firm*—Bean, Kauffman & Snyder

[57] ABSTRACT

A wheeled load connector for connecting a load to a vehicle, such as a pickup truck, includes a tongue connected at its front end to the vehicle between front and rear axles thereof, and a wheel-supported frame fixed to a rear end of the tongue to extend behind the vehicle. A vertically extending channel defined by a pair of spaced plates fixed at the juncture of the tongue and frame is arranged to slidably receive a guide bar attached to the rear of the vehicle, thereby constraining the load connector against side-to-side pivotal motion while permitting vertical pivotal motion thereof. A load may be connected by a universal trailer hitch mounted on the tongue by a mounting member, or by a dump truck bed tiltably connected to the tongue.

16 Claims, 4 Drawing Sheets

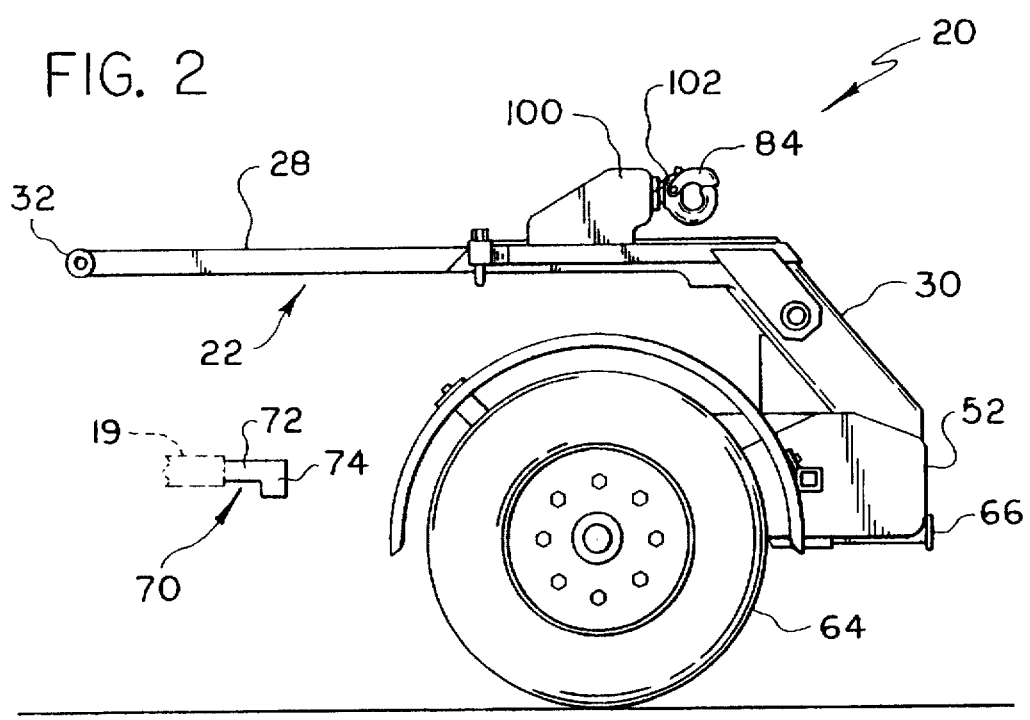
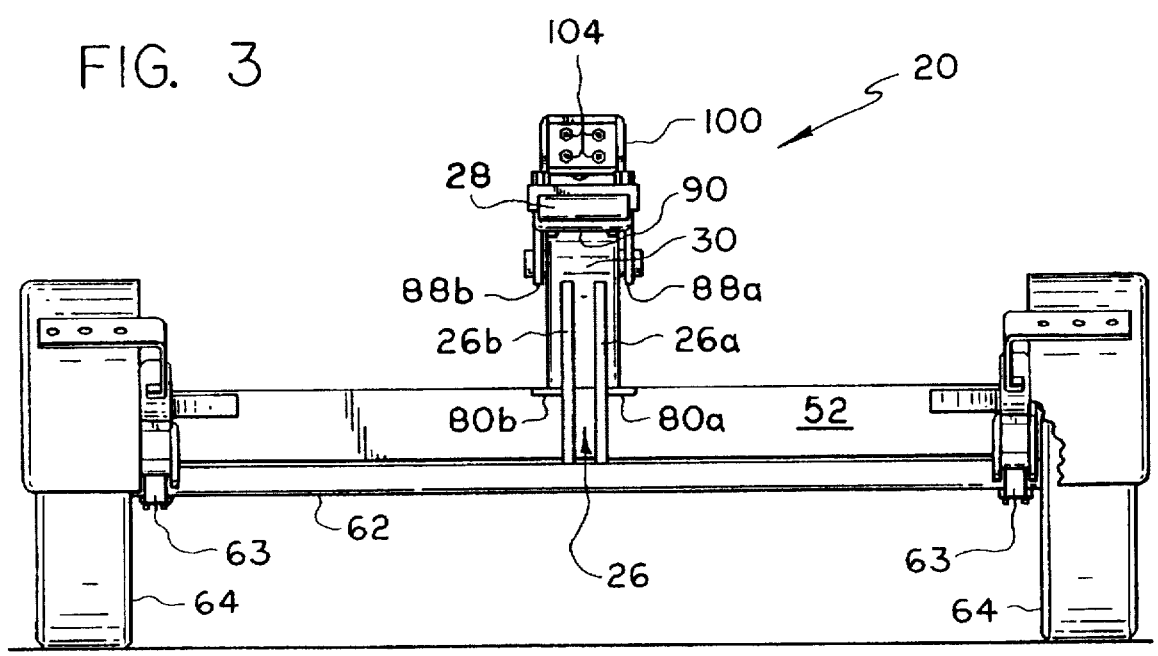

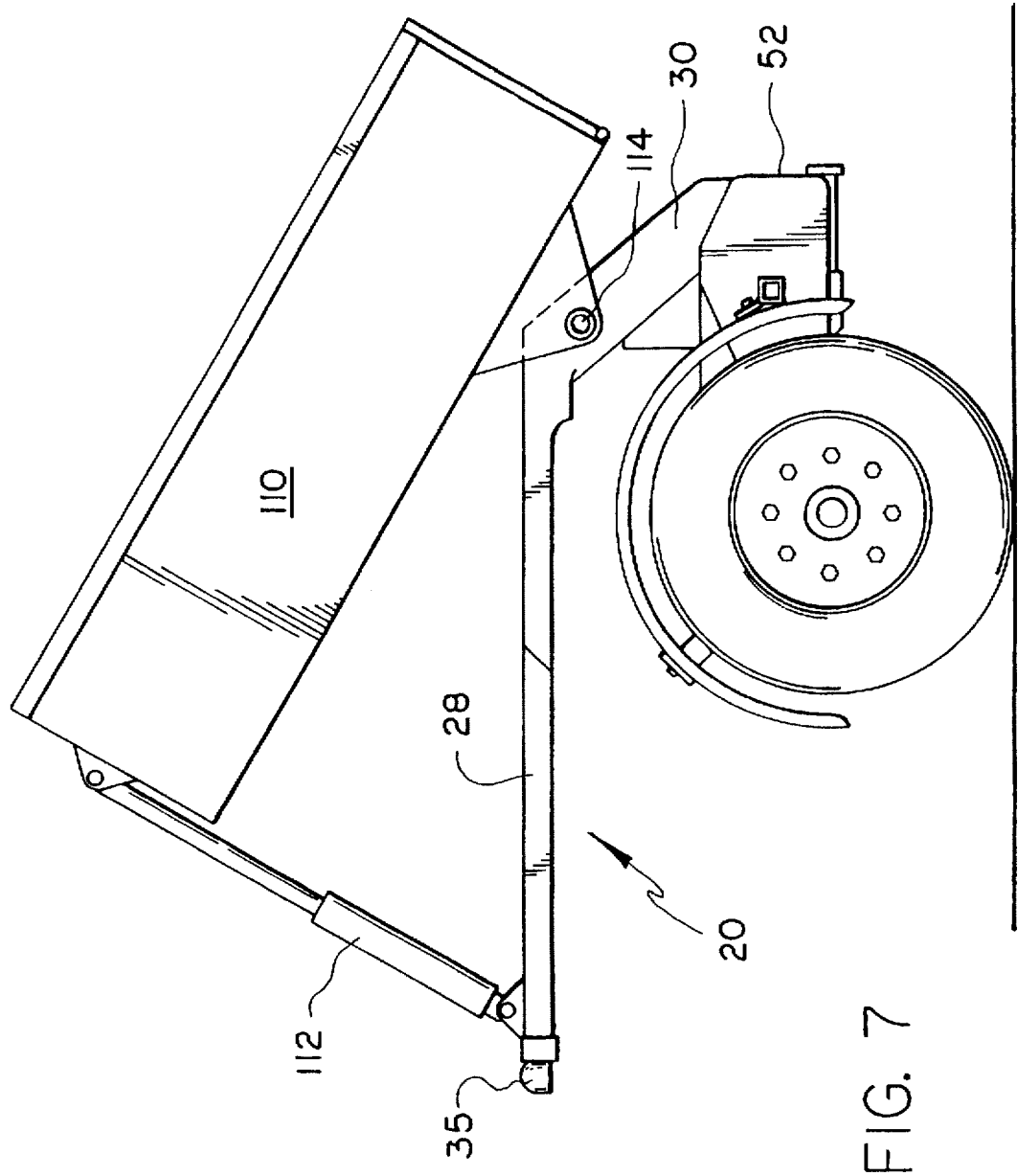

5,727,804

WHEELED LOAD CONNECTOR FOR PICKUP TRUCK

BACKGROUND OF THE INVENTION

1. Field of the Invention

The present invention relates generally to wheeled apparatus removably attachable to a vehicle for enabling connection of a load to the vehicle, and more particularly to a wheeled load connector removably attachable to a vehicle between its front and rear axles and having means for constraining the load connector for vertical movement, and against horizontal movement, about its point of attachment to the vehicle.

2. Description of the Prior Art

Wheeled load connectors, sometimes referred to as dollies, have long been known for permitting a trailer or other cargo to be connected to a vehicle. Prior art load connectors are typically attachable to a rear portion of the vehicle behind a rear axle thereof, such as to a rear bumper of the vehicle, a hitch mechanism fixed to a rear portion of the vehicle chassis, or to a rear portion of the vehicle chassis itself. The method of attachment of the load connector to the vehicle may serve to limit the load connector to vertical pivotal motion relative to the vehicle. For example, the load connectors disclosed in U.S. Pat. Nos. 2,460,466 and 3,930,670 each include a pair of transversely spaced rigid attachment members connected to the vehicle for vertical pivotal motion about a transverse axis.

It is also known to provide a trailer drawbar without wheels attachable to the bed of a pickup truck between its front and rear axles, as taught in U.S. Pat. No. 2,780,480. As with the prior art load connectors mentioned above, such drawbar is limited to vertical pivotal motion by its method of attachment to the truck bed, which includes transversely extending pivot pins at ends of the U-shaped drawbar.

Prior art load connectors typically include a conventional ball hitch at a rear end thereof behind the rear axle of the vehicle for connecting a trailer having a mating socket. If such a load connector includes wheels, the weight associated with a front end of a trailer is supported primarily by wheels of the load connector. If such a load connector does not include wheels, the front end weight of the trailer is supported primarily by the rear wheels of the vehicle, to the detriment of vehicle handling and control.

SUMMARY OF THE INVENTION

Therefore, it is an object of the present invention to provide a wheeled load connector which is releasably attachable to a vehicle between front and rear axles thereof to provide relatively even load distribution between wheels of the vehicle and wheels of the load connector.

It is another object of the present invention to provide a wheeled load connector having means for limiting the load connector to vertical pivotal motion regardless of the manner by which the load connector is attached to the vehicle.

It is a further object of the present invention to provide a wheeled load connector which is easily adaptable to include various means for connecting a load.

In furtherance of these and other objects, a preferred embodiment of the present invention generally comprises an elongated "gooseneck" tongue adapted at its front end for releasable connection to a vehicle, such as a pickup truck, between its front and rear axles; a wheeled frame fixed to a rear end of the tongue and arranged behind the vehicle; a guide bar releasably mated within a female hitch member at the rear of the vehicle; and a vertically extending channel defined by a pair of transversely spaced plates fixed at a juncture of the tongue and frame for slidably receiving the guide bar to prevent side-to-side pivotal motion of the load connector while permitting vertical pivotal motion thereof.

A preferred means for connecting a load to the tongue comprises a mounting member removably attached to the tongue for connecting a universal trailer hitch to the tongue. The mounting member has a first portion adapted to overlie a horizontal front portion of the tongue, a second portion joined with the first portion to generally straddle the rear inclined portion of the tongue, and an upstanding portion fixed to the first portion and defining a rearwardly directed face to which the trailer hitch is mounted. A front end of the mounting member is secured to the tongue by a U-bolt, while a bottom/rear end of the second portion is pinned to the tongue. An alternative load connecting means is a dump truck bed tiltably connected to the tongue.

BRIEF DESCRIPTION OF THE DRAWINGS

The nature and mode of operation of the present invention will now be more fully described in the following detailed description of the preferred embodiments taken with the accompanying drawing figures, in which:

FIG. 2 is a side elevational view of the wheeled load connector shown in FIG. 1, with a mating guide bar attached to the pickup truck also being shown;

FIG. 3 is a front elevational view thereof;

FIG. 7 is a side elevational view of an alternative embodiment of the present invention having a socket for receiving a ball-type hitch and a tiltable dump truck bed for carrying a load.

DETAILED DESCRIPTION OF THE PREFERRED EMBODIMENTS

Figure 1:
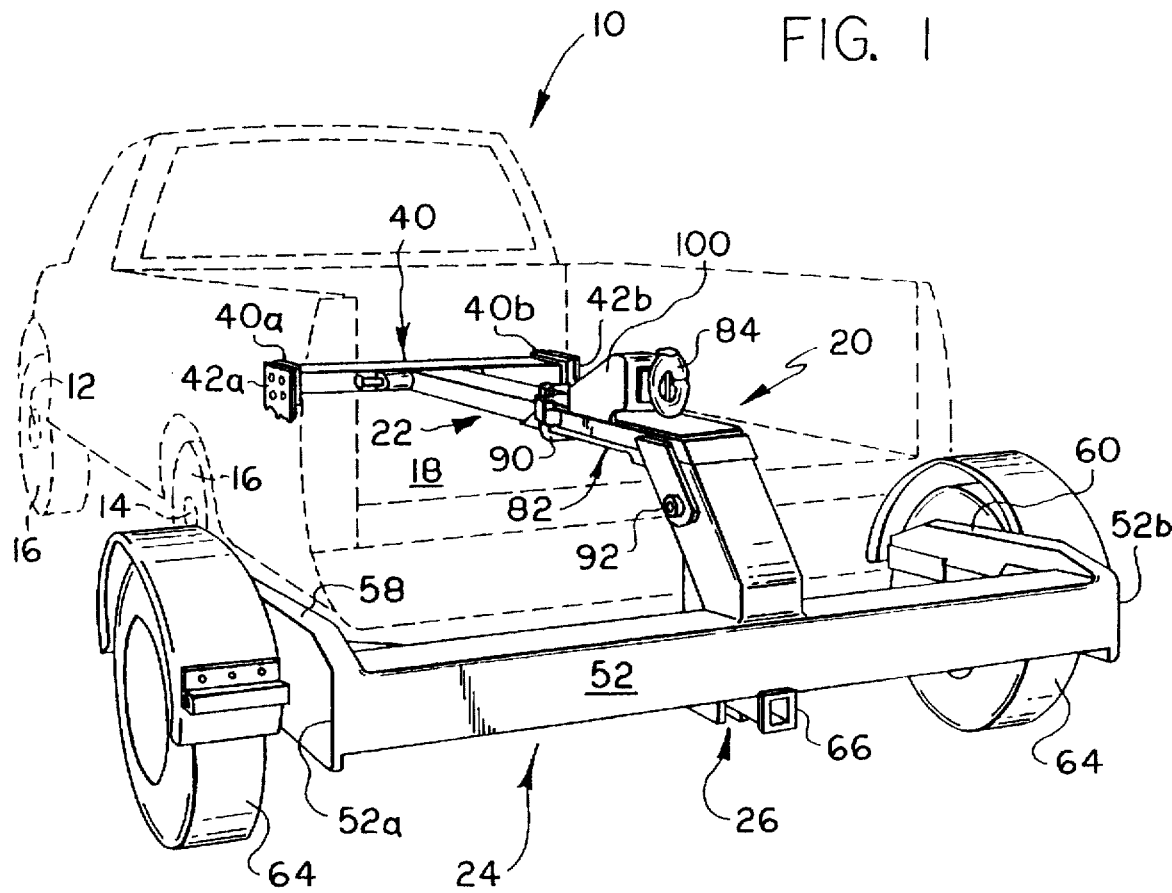
FIG. 1 is a rear perspective view of a wheeled load connector formed in accordance with a preferred embodiment of the present invention connected to a pickup truck.
Figure 5:
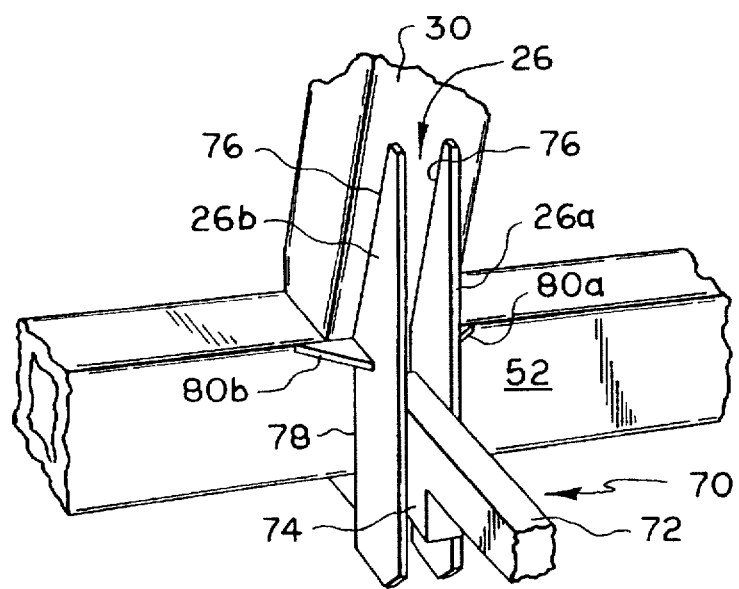
FIG. 5 is a partial perspective view showing the guide bar received within a vertically extending channel of the wheeled load connector.

The present invention is intended for use with a tow-vehicle, for instance a pickup truck 10 as depicted in FIG. 1, having respective front and rear axles 12 and 14 for mounting ground engaging wheels 16, and a bed 18. A wheeled load connector formed in accordance with a preferred embodiment of the present invention is shown connected to pickup truck 10 and is generally identified by the reference numeral 20. Load connector 20 comprises an elongated tongue 22, a wheel-supported frame 24, and a vertically extending channel 26, seen more clearly in FIGS. 3 and 5.

Figure 4:
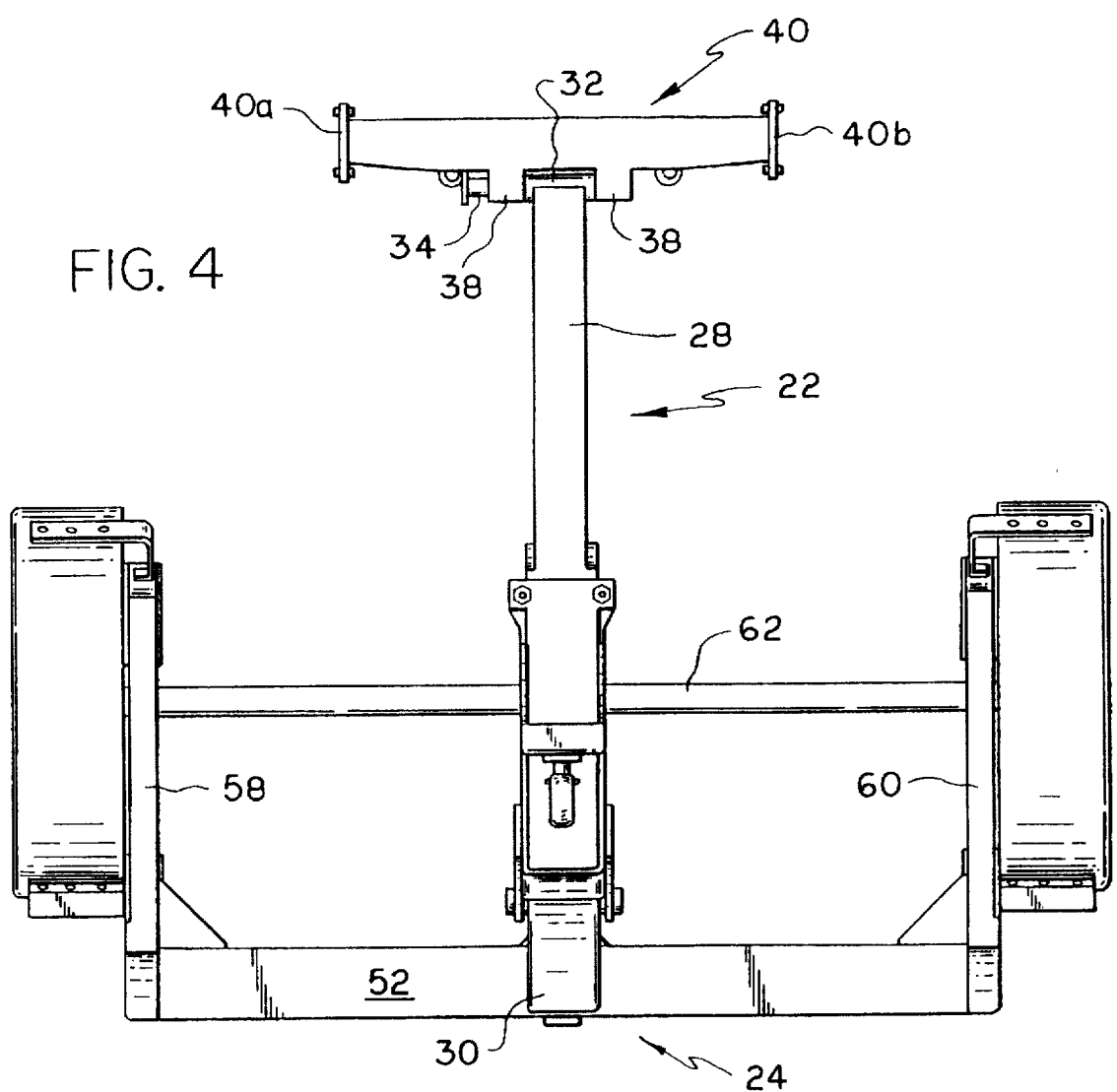
FIG. 4 is a top plan view thereof.

Referring also now to FIGS. 2 and 4, elongated tongue 22 is preferably a "gooseneck" type member having a horizontal front portion 28 and an inclined rear portion 30 extending from a rear end of the first portion. A front end of tongue 22 is adapted for pivotal releasable connection to truck 10 by provision of a transversely extending sleeve 32 welded thereto, which sleeve may be positioned to slidably receive a transversely extending connection pin 34. The opposite ends of connection pin 34 are secured within coaxially aligned pin receiving openings in hinge elements 38 provided on a mounting fixture 40, which in turn includes opposite ends 40a and 40b securely bolted to respective opposing vertical plates 42a and 42b fixed to the truck chassis between axles 12 and 14 and extending upward through truck bed 18. However, as will be apparent from inspection of FIG. 7, the present invention may also be practiced utilizing alternative means for connecting tongue 22 to truck 10, including but not limited to a ball hitch socket 35 provided at the front end of tongue 22 for mating with a conventional "fifth wheel" ball hitch (not shown) fixed to the truck chassis between axles 12 and 14 and arranged to extend through truck bed 18.

Generally U-shaped frame 24 is fixed to tongue 22 by welding a transversely extending main portion 52 of frame 24 to a rear end of the tongue midway between opposite ends 52a and 52b of the main portion. Frame 24 includes a pair of opposed leg portions 58 and 60 extending forwardly from main portion ends 52a and 52b, respectively, and a transversely extending auxiliary axle 62 rotatably journalled by a pair of spring-mounted bearings 63 associated one to each leg portion. A pair of ground-engaging wheels 64 are mounted at opposite ends of auxiliary axle 62. A female hitch member 66 is preferably provided at a central location on main portion 52 to replace a standard female hitch member 19 provided on the rear of truck 10 and used by the present invention as described in the next paragraph.

In accordance with the present invention, a guide bar 70 includes a first end 72 adapted to be received and releasably pinned within female hitch member 19, and a second end 74 sized for slidable fit within vertically extending channel 26 of load connector 20. Vertical channel 26 is preferably defined by a pair of transversely spaced plates 26a and 26b fixed along respective first edges 76 thereof to inclined rear portion 30 of tongue 22, and along respective second edges 78 thereof to main portion 52 of frame 50. A pair of gussets 80a and 80b arranged between respective outer surfaces of plates 26a and 26b and frame main portion 52 provide added strength to the plates. Vertical channel 26 is arranged to receive second end 74 of guide bar 70 when load connector 20 is connected to vehicle 10. As will be understood, the mating of guide bar 70 within vertical channel 26 acts to prevent side-to-side pivotal motion of load connector 20 about an imaginary vertical axis where the front end of tongue 22 connects to truck 10, thereby enabling the load connector to act as a physical extension of the truck itself with an additional axle. Load connector 20 is, however, free to pivot vertically about an imaginary transverse axis where the front end of tongue 22 connects to truck 10 due to the sliding fit of guide bar 70 within vertical channel 26. Importantly, guide bar 70 and vertical channel 26 function independently of the means used to connect the front end of tongue 22 to truck 10, and at a point spaced from the connection location for advantageous leverage.

Figure 6:
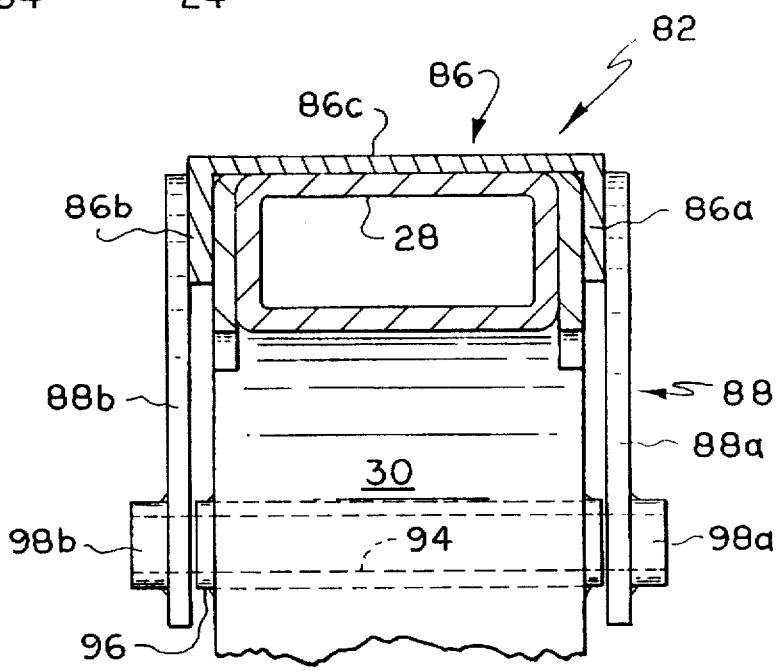
FIG. 6 is a cross-sectional view taken generally along the line 6—6 in FIG. 2.

A preferred means for connecting a load to tongue 22, shown in FIGS. 1-4 and 6, comprises a mounting member 82 having a universal trailer hitch 84 attached thereto. As best seen in FIG. 6, mounting member 82 includes a U-shaped first portion 86 adapted to overlie horizontal front portion 28 of tongue 22, and a second portion 88 including a pair of opposed linkage plates 88a and 88b welded to respective sides 86a and 86b of first portion 86 and generally arranged to follow inclined rear portion 30 of tongue 22. A front end of first portion 86 is secured to horizontal front portion 28 of tongue 22 by a U-bolt 90. A bottom/rear end of second portion 88 is connected to inclined rear portion 30 of tongue 22 remotely of horizontal front portion 28 by a transversely extending removable pin 92 received within a pin opening 94 extending through linkage plates 88a and 88b and inclined rear portion 30, as defined by a segment of tubing 96 welded to extend through inclined rear portion 30, and a pair of bushings 98a and 98b fixed to outer faces of linkage plates 88a and 88b, respectively. Mounting member 82 further includes an upstanding portion 100 welded to a top surface 86c of first portion 86. Upstanding portion 100 provides a rearwardly directed face 102 having a plurality of bolt holes 104 therethrough for mounting trailer hitch 84. In accordance with the present invention, mounting member 82 provides a readily removable yet secure attachment mechanism for trailer hitch 84, such that tow loading on trailer hitch 84 is distributed between U-bolt 90 and pin 92.

If desired, mounting member 82 may be removed and alternative means for connecting a load to tongue 22 may be installed. As shown in FIG. 7, a dump truck bed 110 may be connected to tongue 22 for tilting rotation about a transverse axis defined by a hinge pin 114 received within pin opening 94, and driven for example by a pneumatic piston 112 connecting the front end of tongue 22 with a front end of dump truck bed 110. The scope of the present invention is not limited by the means for connecting a load thereto, in that a wide variety of means are possible.

The present invention enables a user to easily adapt an ordinary pickup truck for heavy loading in a manner which does not result in unsafe rear axle overloading. When not in use, load connector 20 may simply be disconnected from truck 10 and stored.

What is claimed is:

1. An apparatus for connecting a load to a tow vehicle having transversely extending front and rear axles for mounting a plurality of ground-engaging wheels, said apparatus comprising:

an elongated tongue having a front end adapted for removable connection to said vehicle at a location between said front and rear axles and a rear end extending behind said vehicle;

a frame fixed to said rear end of said tongue, said frame having a pair of spaced ground-engaging wheels mounted thereon for rotation about a transverse axis;

means for connecting said load to said tongue; and a vertically extending channel connected to said frame and arranged to slidably receive a rearwardly extending guide bar of said vehicle when said apparatus is connected to said vehicle.

2. The apparatus according to claim 1, wherein said channel is defined by a pair of transversely spaced plates fixed to said tongue.

3. The apparatus according to claim 1, wherein said channel is defined by a pair of transversely spaced plates fixed to said frame.

4. The apparatus according to claim 1, wherein said front end of said tongue includes a socket for mating with a ball shaped fifth wheel hitch attached to said vehicle at said location.

5. The apparatus according to claim 1, wherein said means for connecting said load comprises a dump truck bed tiltably connected to said tongue.

6. An apparatus for connecting a load to a tow vehicle having transversely extending front and rear axles for mounting a plurality of ground-engaging wheels, said apparatus comprising:

an elongated tongue having a front end adapted for removable connection to said vehicle at a location between said front and rear axles and a rear end extending behind said vehicle;

a frame fixed to said rear end of said tongue, said frame having a pair of spaced ground-engaging wheels mounted thereon for rotation about a transverse axis, wherein said frame is generally U-shaped and includes a transversely extending main portion fixedly connected to said rear end of said tongue and a pair of opposed leg portions extending forwardly from opposite ends of said main portion, and said spaced wheels are mounted on said frame by a transversely extending auxiliary axle rotatably journalled by said leg portions; and means for connecting said load to said tongue.

7. The apparatus according to claim 6, wherein said channel is defined by a pair of transversely spaced plates fixed to said tongue and said main portion of said frame.

8. An apparatus for connecting a load to a tow vehicle having transversely extending front and rear axles for mounting a plurality of ground-engaging wheels, said apparatus comprising:

an elongated tongue having a front end adapted for removable connection to said vehicle at a location between said front and rear axles and a rear end extending behind said vehicle, wherein said front end of said tongue includes a transversely extending mounting tube for slidable pivotal mating with a transversely extending mounting pin releasably attached to said vehicle at said location;

a frame fixed to said rear end of said tongue, said frame having a pair of spaced ground-engaging wheels mounted thereon for rotation about a transverse axis; and means for connecting said load to said tongue.

9. An apparatus for connecting a load to a tow vehicle having transversely extending front and rear axles for mounting a plurality of ground-engaging wheels, said apparatus comprising:

an elongated tongue having a front end adapted for removable connection to said vehicle at a location between said front and rear axles and a rear end extending behind said vehicle, wherein said tongue includes a horizontal front portion and an inclined rear portion forming an obtuse angle with said horizontal front portion;

a frame fixed to said rear end of said tongue, said frame having a pair of spaced ground-engaging wheels mounted thereon for rotation about a transverse axis; and means for connecting said load to said tongue comprising a mounting member removably attached to said tongue, said mounting member having a first portion adapted to overlie said horizontal front portion, a second portion joined with said first portion and connected to said inclined rear portion remotely of said horizontal front portion, and an upstanding portion defining a rearwardly directed face; and a universal trailer hitch fixed to said face.

10. The apparatus according to claim 9, wherein said first portion of said mounting member is fixed to said horizontal front portion of said tongue by a U-bolt, and said second portion of said mounting member is pivotally connected to said inclined rear portion of said tongue by a transverse pivot pin extending through said second portion and said inclined rear portion.

11. An apparatus for connecting a load to a tow vehicle having transversely extending front and rear axles for mounting a plurality of ground-engaging wheels, said apparatus comprising:

an elongated tongue having a front end adapted for removable connection to said vehicle at a location between said front and rear axles and a rear end extending behind said vehicle;

a frame fixed to said rear end of said tongue, said frame having a pair of spaced ground-engaging wheels mounted thereon for rotation about a transverse axis;

a guide bar attached to said truck to extend rearwardly thereof;

a vertically extending channel connected to said frame, said channel being arranged for slidably receiving said guide bar when said tongue is connected to said vehicle to prevent horizontal motion of said tongue and said frame relative to said vehicle while permitting vertical motion of said tongue and said frame relative to said vehicle; and means for connecting said load to said tongue.

12. The apparatus according to claim 11, wherein said channel is defined by a pair of transversely spaced plates extending downward from said rear end of said tongue.

13. The apparatus according to claim 11, wherein said vertically extending channel is defined by a pair of transversely spaced plates extending forward from said frame.

14. The apparatus according to claim 11, wherein said tongue includes a horizontal front portion and an inclined rear portion forming an obtuse angle with said horizontal front portion, and said means for connecting said load comprises:

a mounting member removably attached to said tongue, said mounting member having a first portion adapted to overlie said horizontal front portion, a second portion joined with said first portion and connected to said inclined rear portion remotely of said horizontal front portion for pivotal motion about a transverse pivot axis, and an upstanding portion defining a rearwardly directed face; and a universal trailer hitch fixed to said face.

15. The apparatus according to claim 14, wherein said first portion of said mounting member is fixed to said horizontal front portion of said tongue by a U-bolt, and said second portion of said mounting member is pivotally connected to said inclined rear portion of said tongue by a transverse pivot pin extending through said second portion and said inclined rear portion.

16. The apparatus according to claim 11, wherein said means for connecting said load comprises a dump truck bed tiltably connected to said tongue.

* * * * *